Jan. 10, 1967   P. GINDES   3,297,971
LOAD CELL
Filed Jan. 21, 1965

INVENTOR.
PHILIP GINDES
BY
George C. Sullivan
Agent

United States Patent Office 3,297,971
Patented Jan. 10, 1967

3,297,971
LOAD CELL
Philip Gindes, West Covina, Calif., assignor to Lockheed Aircraft Corporation, Burbank, Calif.
Filed Jan. 21, 1965, Ser. No. 426,862
2 Claims. (Cl. 338—5)

This invention relates to a load cell, and more particularly to a transducer for measuring compressive (or tensile) forces by means of a tensile column.

Generally the use of strain sensitive elements, such as strain gages, for measurement or indication of stress and strain in structures is well-known. The strain sensitive elements are cemented or bonded to a structural member which is subjected to loading stresses and strains and provides a varying parameter, e.g., resistance, in response to the expansion and contraction of the element which is readily transferred to a varying electrical signal.

Load cells which measure compressive or tensile loads usually utilize one or more of the sensitive elements to convert such loads on the cell to an electrical signal as an indication of the particular loading.

It is believed to be well recognized that commercially available strain gages of the resistive type are particularly more sensitive and accurate for tension loading than for compression. Prior load cells and related transducers have utilized complex and expensive methods of translating compression forces into tension loads on the strain gage. Otherwise, the strain gage is pre-stressed when applied to the loaded member which introduces undesirable static strains and results in a "set" to the gage.

It is therefore desirable to provide a load cell for compression or tension loading and wherein the strain sensitive elements are always subjected to a tension force.

It is accordingly a primary object of this invention to provide a simplified and inexpensive load cell.

A further object is to provide a highly accurate load cell which is inexpensive to manufacture.

Another object is to provide a load cell wherein the sensitive element is subjected to tension forces and is substantially insensitive to side loading.

These and other related objects may be readily appreciated by reference to the following description of the accompanying drawings in which.

Figure 1:
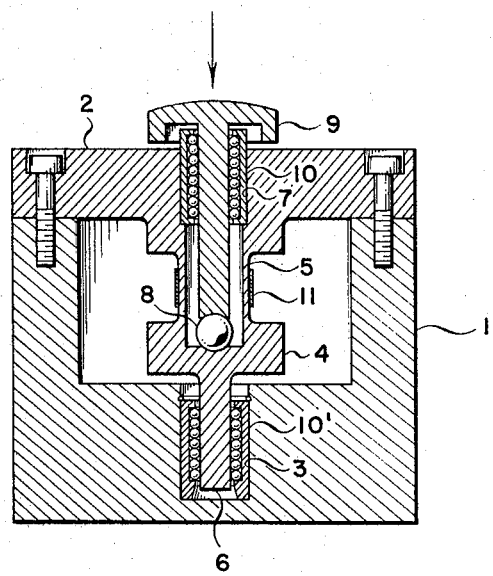
FIG. 1 is an elevational view in section of a first embodiment of the invention.

With reference to FIG. 1, a transducer or load cell in accordance with the invention is illustrated for measuring compressive forces. As shown, the cell may comprise a body portion 1 and an end cap 2. The body 1 is preferably a hollow cylinder having an integral end section. The end section has a central bore 3 which is indicated as extending substantially through the end section from the inside.

The end cap 2 has centrally and axially disposed thereon a hollow cylindrical member or column 4 which has a reduced center portion 5 and a reduced end portion 6. The end cap 2 is preferably integral with the cylinder member 4, and a central bore 7 extends from the upper surface of the end cap into the cylindrical member and beyond the reduced center portion 5.

A steel sphere or ball 8 is located in a central depression at the bottom of bore 7. A loading button and shaft 9 are centrally and axially disposed in bore 7 and contacts the sphere 8. As indicated the bottom of the loading shaft may include a curved depression therein. An axial bearing 10 is pressed into the top of the bore 7 and slidingly surrounds the loading shaft. The reduced end portion 6 is slidingly retained in the end bore 3 by means of axial bearing 10'. Strain gages 11 are cemented or bonded to the reduced center portion 5 with the strain sensitive axis alternately parallel and perpendicular to and equally spaced around the central axis of the cell.

The end cap and body are assembled by means of retaining screws, or equivalent, and may be sealed or waterproofed by means of suitable seals or O-rings.

As assembled, and with the strain gages connected in a bridge circuit (not shown) in the usual manner, a compression load is applied as indicated. The force is transmitted through the shaft and sphere to the bottom of the bore 7, resulting in an elongation of the reduced center portion 5, thereby subjecting the gaging area to tension loading.

Figure 2:
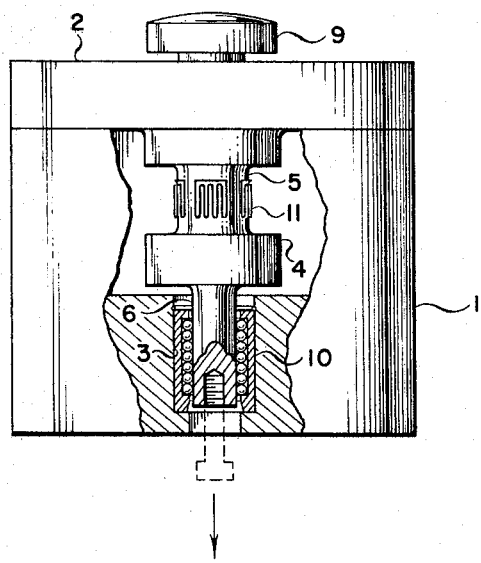
FIG. 2 is an elevational view partially in section of a second embodiment of the invention.

Now with reference to FIG. 2, the load cell is illustrated as identical, except the reduced end portion 6 of the cylindrical member 4 is enlarged and includes a tapped bore in the end thereof. Also, the bore 3 extends through the end of the body 1. A tension loading member shown in broken lines may be threaded into the tapped end of member 6 and a tension load applied as indicated. The manner in which the cell is attached to the structural member for measurement of tension forces is regarded as conventional and not a part of this invention.

It will thus be readily appreciated that the load cell as described herein is greatly simplified, and substantially reduces the manufacturing and assembly. As is evident from the drawings and description, the load cell is comprised of a minimum number of parts and all capable of manufacture by straightforward simple machining methods. Other advantages lie in the fact that with the disclosed structure, all forces are applied through the sphere, eliminating eccentric loading inaccuracies. In addition, since the strain gages are aligned in alternately lateral and longitudinal axes forming a full wheatstone bridge and thus aligned with the load for both compression and tension loading, the cell works at full efficiency.

Another advantage of the present invention is that the same cell can be used for compression and tension loads by simply pretapping the reduced end portion 6, and installing a removable plug in the bottom of the bore 3.

While specific embodiments of the invention have been shown and described, it should be understood that certain alterations, modifications and substitutions may be made to the instant disclosure without departing from the spirit and scope of the invention as defined by the appended claims.

What is claimed is:

1. A load cell for measuring compression and tension loads by means of the elongation of a tensile member, the combination comprising a hollow body portion having cylindrical walls and an end section, an end cap attached to the end of said body portion opposite to said end section, an axial first bore in said end section, a hollow cylindrical column attached to the center of said end cap and extending into said hollow body portion in co-extensive alignment with said cylindrical walls and terminating adjacent said end section, said cylindrical column having a reduced center portion, a central and axial second bore extending through said end cap and into said hollow cylindrical column and terminating below said reduced center portion, strain gage means bonded onto and around the outside surface of said reduced center portion, means for applying a load to the bottom of the second mentioned bore, and means for retaining said column substantially on the central axis to thereby prevent radial deflection, whereby the reduced center portion is stretched proportional to the applied load.

2. A load cell as defined in claim 1, said cylindrical column having a reduced end portion, said first bore including axial bearing means for slidingly retaining the reduced end portion of said cylindrical column within said first bore of said end section, and said means for applying a load to the bottom of the second mentioned bore comprises a sphere positioned in the bottom of the second bore in said cylindrical column and a shaft centrally and axially supported in the second bore and contacting said sphere.

References Cited by the Examiner

UNITED STATES PATENTS

| | | | |
|---|---|---|---|
| 2,439,146 | 4/1948 | Ruge | 338—5 X |
| 2,472,047 | 5/1949 | Ruge | 338—5 X |
| 2,645,121 | 7/1953 | Scott | 73—144 |
| 2,703,935 | 3/1955 | Mead et al. | 338—2 X |
| 2,814,946 | 12/1957 | Harris. | |
| 2,995,034 | 8/1961 | Boiten | 338—5 X |
| 3,057,202 | 10/1962 | Dumas. | |
| 3,216,517 | 11/1965 | John | 73—141 X |
| 3,240,065 | 3/1966 | Taber | 73—141 X |

FOREIGN PATENTS 645,845    11/1950    Great Britain.

RICHARD M. WOOD, *Primary Examiner.*

W. D. BROOKS, *Assistant Examiner.*